Figure 1:
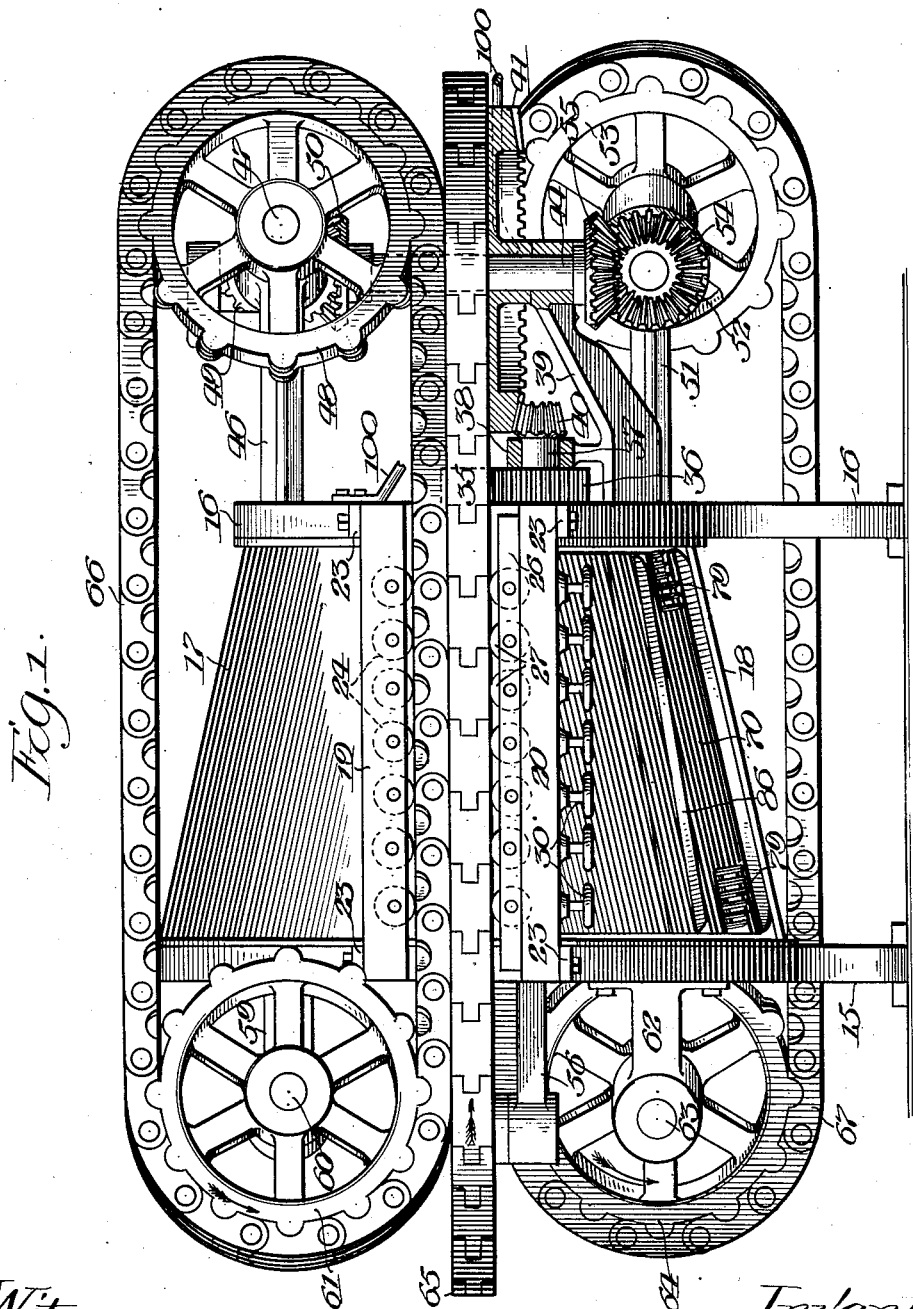

H. L. VAUGHAN.
FIBER CLEANING MACHINE.
APPLICATION FILED SEPT. 26, 1910.

998,054.

Patented July 18, 1911

4 SHEETS—SHEET 1.

Witnesses
Inventor
Henry L. Vaughan

H. L. VAUGHAN.
FIBER CLEANING MACHINE.
APPLICATION FILED SEPT. 26, 1910.
998,054.
Patented July 18, 1911.
4 SHEETS—SHEET 2.
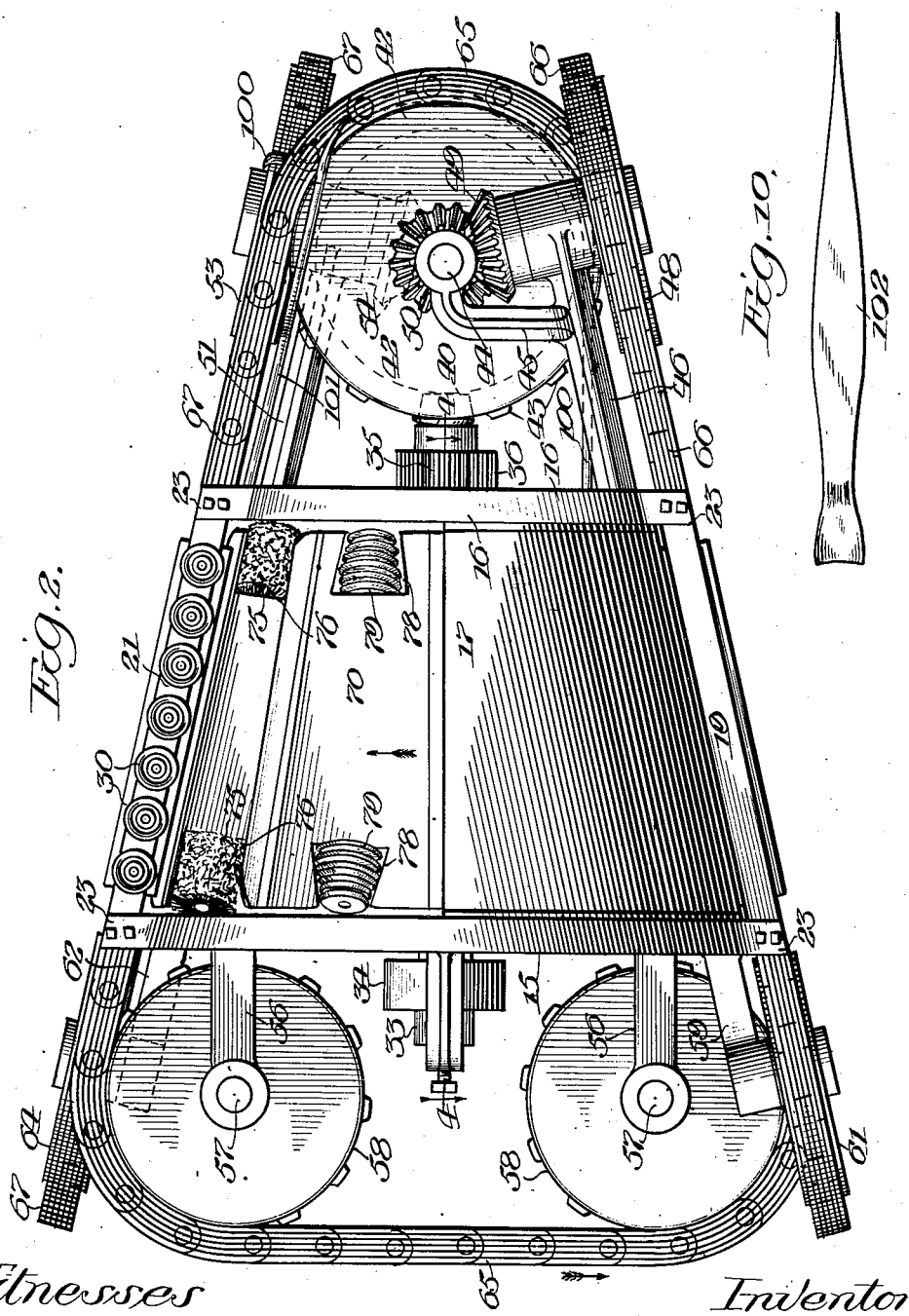

H. L. VAUGHAN.
FIBER CLEANING MACHINE.
APPLICATION FILED SEPT. 26, 1910.
998,054.
Patented July 18, 1911.
4 SHEETS—SHEET 3.
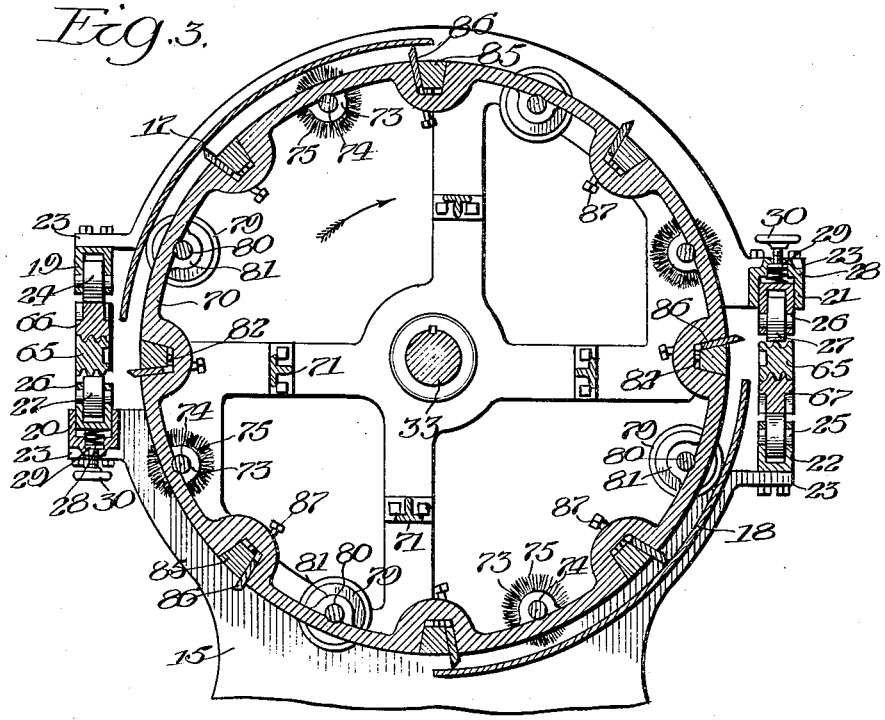
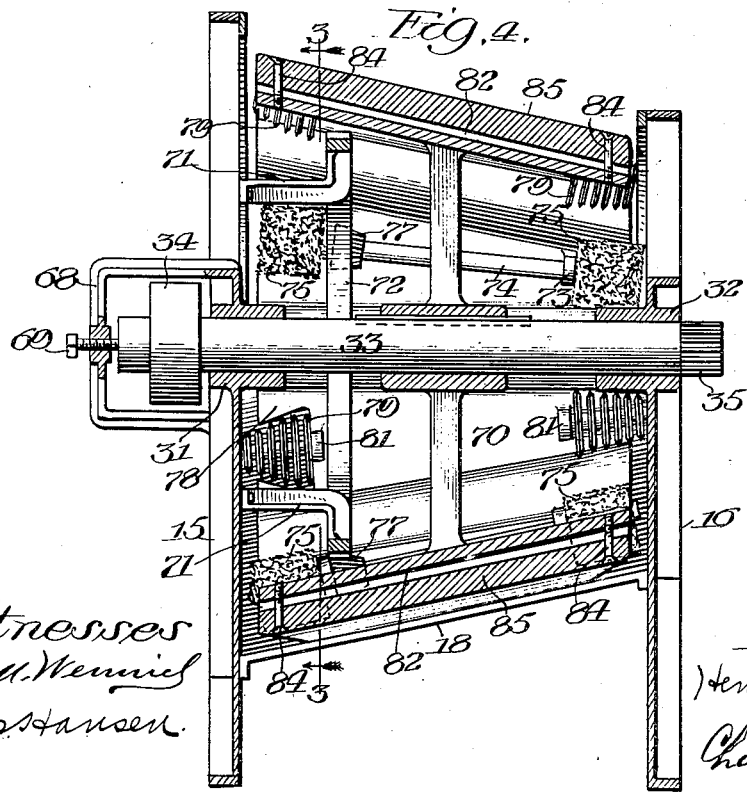
Witnesses
Inventor
Henry L. Vaughan H. L. VAUGHAN.
FIBER CLEANING MACHINE.
APPLICATION FILED SEPT. 26, 1910.
998,054.
Patented July 18, 1911.
4 SHEETS—SHEET 4.
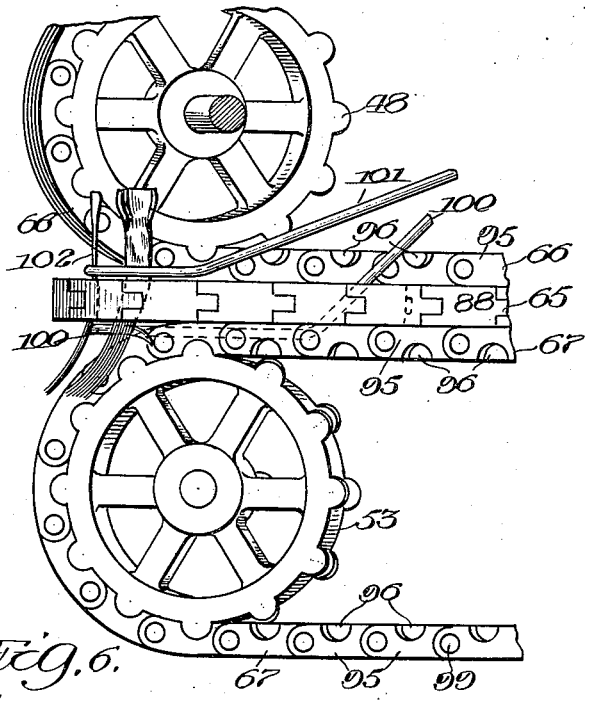
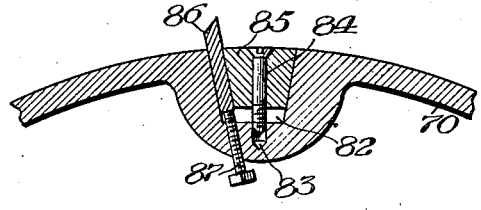
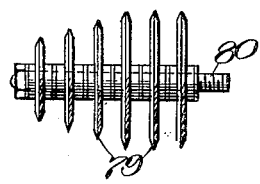
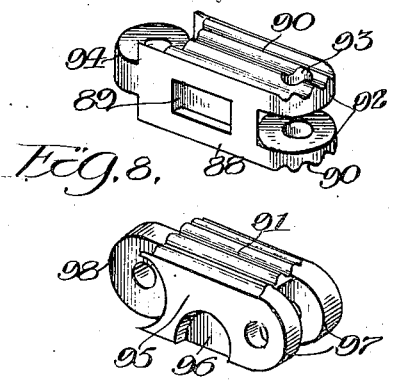
Witnesses
Inventor
Henry L. Vaughan

UNITED STATES PATENT OFFICE.

HENRY L. VAUGHAN, OF EL PASO, TEXAS.

FIBER-CLEANING MACHINE.

998,054.   Specification of Letters Patent.   Patented July 18, 1911.

Application filed September 26, 1910. Serial No. 583,827.

*To all whom it may concern:*

Be it known that I, HENRY L. VAUGHAN, a citizen of the United States, residing at El Paso, in the county of El Paso and State of Texas, have invented certain new and useful Improvements in Fiber-Cleaning Machines, of which the following is a specification.

This invention relates to certain new and useful improvements in that class of apparatus or machines used in the art of obtaining fiber from plants of various kinds, such as Lechuguilla (commonly called "shin-dagger"), Yucca, Maguey, Henequen, and other kinds of semi-tropical or tropical plants, as well as plants of the temperate zones; and it consists in certain peculiarities of the construction, novel arrangement and operation of the various parts thereof, as will be hereinafter more fully set forth and specifically claimed.

The principal object of the invention is to provide a machine for decorticating fibrous plants and removing the pulp from the fibers thereof, which shall be simple and inexpensive in construction, strong, durable, and efficient in operation, and so made that the plants, while being operated on by the machine, will be subjected to breaking or crushing, cutting and brushing operations, to the end that the long fiber of the plants will be thoroughly cleaned and in such a manner as to not impair the same.

Other objects and advantages of the invention will be disclosed in the subjoined description and explanation.

In order to enable others skilled in the art to which my invention pertains, to make and use the same, I will now proceed to describe it, referring to the accompanying drawings, in which—

Figure 1, is a view in side elevation of a fiber cleaning machine, embodying the invention; Fig. 2, is a plan view thereof; Fig. 3, is a cross-sectional view of the rotary drum of the machine, taken on line 3—3 of Fig. 4, looking in the direction indicated by the arrows, and also showing in section the gripping-conveyers for the leaves of the plants; Fig. 4, is a central vertical section taken on line 4—4 of Fig. 2, looking in the direction indicated by the arrows; Fig. 5, is an inner view in elevation of a part of one end of the machine showing the means for shifting the position of the plants after a portion of the fiber thereof has been cleaned, so as to subject the uncleaned part to the action of the machine; Fig. 6, is a cross-sectional view of a portion of the drum, showing the means for adjustably securing the scutching blades thereto; Figs. 7, and 8, are detached perspective views of the links of the gripping chains or conveyers; Fig. 9, is a side view of one of the groups of cutting disks; and Fig. 10, is a plan view of one of the leaves of the fibrous plants.

Like numerals of reference, refer to corresponding parts throughout the different views of the drawings.

The main or supporting frame of the machine may be made of any suitable size and form, but in the present instance it is shown as consisting of two uprights 15, and 16, which are transversely disposed with respect to the machine and are united together by means of a pair of segmental shields or plates 17, and 18, which are preferably oppositely disposed as is clearly shown in Fig. 3, of the drawings. The uprights 15, and 16, are also connected together on one of their sides by means of horizontally disposed channeled bars 19, and 20, and on their other side by means of similarly disposed and constructed bars 21, and 22, all of which bars are bolted to laterally extended lugs 23, on the sides of said uprights so that the bars 19, and 20, will be spaced apart and so that the bars 21, and 22, will also be spaced from one another. The bar 19, carries a number of anti-friction rollers 24, which are journaled in the depending sides of said bar, and the bar 22, has journaled thereon a series of rollers 25, which extend upwardly a slight distance through the channel of said bar. In the channel of each of the bars 20, and 21, is adjustably located a channeled bar 26, each of which has journaled thereon a series of rollers 27. The bars 26, are yieldingly supported within the channels of the bars 20, and 21, by means of springs 28, which rest at one of their ends against the bars 26, and at their other ends against washers 29, which are secured on the inner ends of adjusting screws 30, located in suitable openings in the bars 20, and 21, so that by turning said screws in the proper direction, the position of the bars 26, with respect to the bars 20, and 21, may be adjusted so as to give the desired tension to the gripping conveyers or chains as will be presently explained.

The uprights 15, and 16, are provided at suitable points with bearings 31, and 32, respectively, in which is journaled the driving shaft 33, which has mounted near one of its ends a pulley 34, to which power may be applied for operating the machine. The other end of the shaft 33, has mounted thereon outwardly from the upright 16, a pinion 35, to mesh with a gear 36, mounted on a stub-shaft 37, which is journaled in a suitable bearing 38, on a bracket 39, extended rearwardly from the lower portion of the upright 16, as is clearly shown in Fig. 1, of the drawings. The shaft 37, has mounted on its rear end a beveled gear 40, which meshes with a similar gear 41, on the lower face of a horizontally disposed wheel 42, which has on its periphery a series of sprockets 43, to engage the links of the main endless gripping conveyer or chain which passes around said wheel. The wheel 42, and its beveled gear 41, is mounted on a vertical shaft 44, which is journaled in suitable bearings on an arm 45, projecting laterally from a rearwardly extended bracket 46, on the upper portion of the upright 16, and near one side thereof. Journaled on the bracket 46, is a stub-shaft 47, which has mounted thereon a sprocket wheel 48, to engage the links of the rearwardly feeding auxiliary gripping conveyer or chain. As shown in Figs. 1, and 2, the wheel 48, is located vertically and at one side of the wheel 42, but above the same. Mounted on the shaft 47, on which the wheel 48, is mounted, is a beveled gear 49, which meshes with a similarly shaped gear 50, on the upper portion of the vertical shaft 44, so that the wheel 48, may be driven when the shaft 44, is rotated.

Extended rearwardly from the lower portion of the upright 16, of the frame, and on the opposite side thereof from the bracket 46, is another bracket 51, which has journaled on its rear portion a shaft 52, on which is mounted a sprocket wheel 53, to engage the forwardly feeding auxiliary gripping conveyer or chain. The shaft 52, has mounted on its inner end a beveled gear 54, which meshes with a similar gear 55, mounted on the lower end of the shaft 44, which, as before stated, is vertically journaled.

By reference to Figs. 1, and 2, of the drawings, it will be understood that the wheel 53, is vertically located at the periphery of the wheel 42, yet below the same, and that the wheels 48, and 53, are obliquely mounted in different directions with respect to the supporting frame.

Extending horizontally from the upright 15, of the frame, and toward the feeding or front end of the machine, are brackets 56, on each of which is vertically journaled a shaft 57, each of which has mounted thereon a sprocket wheel 58, to engage the links of the main and gripping conveyer or chain. The wheels 58, are mounted on a horizontal plane with the wheel 42, and by reference to Figs. 1, and 2, of the drawings, it will be seen and understood that the main conveyer passes around all three of said wheels.

Extended from the upper portion of the upright 15, of the frame, and near one side thereof toward the feeding end of the machine, is a bracket 59, on which is horizontally journaled a shaft 60, having mounted thereon a sprocket wheel 61, which engages the forwardly feeding auxiliary gripping conveyer or chain, and journaled on a bracket 62, also extending from the upright 15, but at the lower portion of the opposite side thereof from the bracket 59, is a shaft 63, on which is journaled a sprocket wheel 64, to engage the links of the forwardly feeding auxiliary conveyer or chain.

From the above and by reference to Figs. 1, and 2, of the drawings, it will be seen that the wheels 48, and 61, are journaled in alinement above the main gripping conveyer, which is designated by the reference numeral 65, and that the wheels 53, and 64, are journaled in alinement with one another below said conveyer, and that the rearwardly feeding auxiliary conveyer 66, passes over the wheels 48, and 61, while the forwardly feeding auxiliary conveyer 67, passes over the wheels 53, and 61, or lower wheels. The upright 15, is provided on its front surface with a yoke 68, which embraces the front end of the shaft 33, and has a screw 69, extended through its transverse portion and in engagement with the front end of said shaft, by means of which screw the said shaft may be adjusted longitudinally within its bearings 31, and 32, on the main frame. Rigidly mounted on the shaft 33, between the uprights 15, and 16, is a truncated cone-shaped drum 70, which tapers rearwardly as shown, and fits between the shields 17, and 18, which shields are converged toward their rear ends to conform to the taper of said drum.

Extended from the rear surface of the upright 15, of the frame within the drum 70, are a number of arms 71, which support at their inner ends a band gear 72, which is located near the inner surface of the front or flared end of the drum.

Journaled longitudinally on the inner surface of the drum 70, and usually on bosses 73, thereon, are a series of shafts 74, which extend from one end of the drum 70, to the other, and have on each of their ends a cylindrical brush 75, which are adapted to operate through openings 76, formed in the drum so as to permit the bristles of said brushes to come in contact with the leaves of the plants and the fiber thereof. Mounted on each of the shafts 74, is a gear 77, which meshes with the gear 72, so that in the rotation of the drum 70, said brushes will be rotated. Each end of the drum 70, is also provided with openings 78, for the operation of rotary disk cutters 79, which are rotatably mounted in groups on shafts 80, which shafts are supported on bosses 81, on the inner surface of the drum 70, near the inner ends of the openings 77, therein. As shown in Figs. 2, 4, and 9, of the drawings, these cutting disks 79, are graduated in size, that is to say, each of the groups of disks at the front or flared end of the drum consists of a series of disks which increase in size rearwardly from the front or flared end of the drum, while each of the groups at the smaller end of the drum consists of a series of disks 79, decreasing the size toward the rear upright 16, of the frame. The outer surface of the drum 70, is formed with a series of longitudinally extended channels 82, which preferably have their sides inwardly inclined and are provided with screw-threaded sockets 83, as is clearly shown in Fig. 6, to receive screws 84, which are extended through suitable openings in wedge shaped keys 85, used for holding the scutch blades 86, in position in said channels, one of which blades is located against one of the side walls of each of said channels, see Figs. 3, and 6, of the drawings.

Extended from the inner surface of the drum through suitable openings therein leading to each of the channels 82, are adjusting screws 87, which rest against the inner surface of the scutch blades 86, and are used for adjusting said blades, for it is apparent that by loosening the screws 84, which hold the keys 85, in position, and by turning the screws 87, in the proper direction, the blades 86, may be adjusted inwardly or outwardly so as to have their free edges located at the proper distances from the inner surface of the shields 17, and 18, between which surfaces and the outer surface of the drum they are adapted to operate.

The main conveyer chain 65, consists of a series of links 88, (see Fig. 7) each of which links has on its inner surface a recess 89, to receive the sprockets 43, on the wheels 42, and 58, around which wheels said conveyer passes. Each of the links 88, has its upper and lower surfaces provided with longitudinally extended corrugations 90, to fit corrugations 91, correspondingly formed in the adjacent surfaces of the links of the auxiliary conveyers 66 and 67, which contact with the upper and lower surfaces respectively of the chain 65, or main conveyer. One end of each of the links 88, of the main conveyer is provided with a pair of spaced apart extensions 92, having openings 93, for a pintle used for pivotally securing an apertured extension 94, on the end of the adjacent link thereto. Thus it will be seen that the links 88, are connected together in such a manner that they will have lateral movement with respect to one another so as to readily pass around the wheels 42, and 58, of the machine. Each of the links 95, of the chains or conveyers 66, and 77, is provided on one of its surfaces with recesses 96, to engage sprockets on the wheels, over which said chain passes, and each of said links has on its surface adjacent to the main conveyer or chain 65, longitudinally extended corrugations 91, to coact with those on the adjacent surface of the main conveyer so as to grip the fibrous leaves or plants. One end of each of the links 95, is provided with a pair of spaced apart extensions 97, to receive therebetween an extension 98, on the adjacent end of the adjacent link of the chain, which extensions are pivotally secured together by means of a pintle 99, inserted through openings in said extensions. By this arrangement it is apparent that the chains 66, and 67, will be flexible in a vertical plane so as to pass over their respective sprocket wheels, but will have no lateral movement with respect to one another.

By reference to Figs. 1, and 3, of the drawings, it will be seen that the chain or conveyer 65, rests at its lower surface on one side of the machine against the rollers 27, and on the other side of the machine lies on top of the chain or conveyer 67, which in turn rests on the rollers 25, on said side of the machine. It will also be seen by reference to said figures that the chain or conveyer 66, rests on the upper surface of the conveyer 65, on one side of the machine and is held in such position by means of the rollers 24, which contact with the upper surface of the chain 66, in its progress rearwardly. The bars 26, carrying the rollers 27, are yieldingly supported by the springs 23, the tension of which can be regulated by means of the adjusting screws 30, so as to cause the gripping conveyers to be held in the desired positions with respect to one another in order to properly grip or clamp the leaves of the plant.

Secured at one of its ends to the rear surface of the upright 16, of the frame, and near the upper portion of one of its sides is a shifting arm 100, which extends downwardly and rearwardly under and near the periphery of that portion of the wheel 42, adjacent to the wheel 48, and then extends in a circular direction outwardly from and below the periphery of said wheel and terminates over the rear portion of the conveyer or chain 67, near the point at which it engages the lower surface of the main conveyer or chain 65, at the rear end of the machine. Secured at one of its ends to the rear portion of the upright 16, of the frame and near the chain 67, yet above the same, is a shifting arm 101, which extends rearwardly just above the upper surface of the wheel 42, and main conveyer or chain 65, as is clearly shown in Fig. 2, of the drawings.

The operation of the machine or apparatus is simple and as follows:—The leaves of the plants to be treated are, as is well known, elongated or dagger like in shape, for instance as shown in Fig. 10, and may be fed from a table or other suitable support (not shown) preferably with their butt ends disposed inwardly onto the main conveyer or chain 65, and wheel 58, shown at the left and lower end of Fig. 2, and at the left of Fig. 1, which end of the machine is termed the front or feeding end. As the said wheel 58, rotates, which will be caused by applying power to the pulley 34, on the driving shaft 33, which, through the instrumentality of the gears and chains connecting it with the various wheels of the machine, will cause the same to operate, it is apparent that the leaves 102, will be gripped or clamped at about their middle portions between the upper surface of the main conveyer 65, and the lower surface of the upper or auxiliary conveyer 66, and thereby carried between the flared or front end of the drum 70, and the shield or plate 17, in which operation the leaves will be cut longitudinally by means of the rotary disks 79, acted upon by the rotary brushes 75, and will be broken, beaten and scraped by the scutch blades 86, as is apparent. As the leaves are carried to the smaller or rear end of the drum, it is evident that they will again be acted upon by the disks 79, and brushes 75, at the smaller or rear end of the drum. In the further progress of the leaves, the cleaned portion or fiber thereof, will pass under the arm 100, which will deflect said portion or fiber downwardly between the periphery of the wheel 42, and the inner surface of the main conveyer 65, which contacts with said wheel so that the fiber or cleaned portion of the leaves will be gripped thereby, when in the further rotation of the wheel 42, and progress of the conveyer 65, the uncleaned portion of the leaves will be released from between the upper surface of the main conveyer 65, and the lower surface of the auxiliary conveyer 66, and will be located above the wheel 42, and rear portion of the main conveyer. In this operation the curved portion of the arm 100, will deflect the cleaned portion of the leaves or fiber outwardly and upwardly over the conveyer 67, and wheel 53, so as to cause the cleaned portion or fibers to be clamped between the conveyer 67, and the lower surface of the conveyer 65, or main conveyer, when the free end of the arm 101, will raise and turn the uncleaned portion of the leaves over onto the wheel 42, so that as the leaves are carried toward the feeding end of the machine by the conveyers 65, and 67, the uncleaned portion will be caused to pass between the drum 70, and shield 18, in which passage it will be acted upon by the disks 79, brushes 75, and scutch blades 86, in a similar manner to that above described. After the fibers of the leaves have thus been thoroughly cleaned, it is apparent that they will be discharged from between the conveyers 65, and 67, at the front end of the machine, but at the opposite side thereof from which the material is fed thereinto for example, at the upper and left end of Fig. 2, of the drawings.

From the foregoing and by reference to the drawings, it will be understood that by employing the tapered drum with the converging shields supported outwardly therefrom, the said drum can be readily and bodily adjusted with respect to the said shields so as to attain the desired space between the drum and shields, and between the outer portions of the fiber cleaning devices and shields. Furthermore, it will be understood that by using one horizontally disposed wheel at one end of the machine, and two of such wheels at the other end thereof around which wheels the main conveyer passes, that the construction of the machine will be simplified and that simple and efficient means for transferring the leaves or fiber from one side of the machine to the other by means of the main conveyer and the single horizontally disposed wheel in connection with the shifting arms 100, and 101, will be furnished.

Having thus fully described my invention what I claim as new and desire to secure by Letters-Patent is—

1. In a machine of the character described, the combination with the main frame, of a rotary drum mounted thereon, fiber cleaning means on the drum, segmental shields mounted on the frame outwardly from the drum, a main conveyer embracing the drum, an auxiliary conveyer mounted at one side of the frame in contact with one of the surfaces of the main conveyer, another auxiliary conveyer mounted at the other side of the frame and in contact with the opposite surface of the main conveyer, and means to rotate the drum and operate the conveyers.

2. In a machine of the character described, the combination with the main frame, of segmental shields mounted thereon, a rotary drum adjustably mounted on the main frame inwardly of said shields, fiber cleaning means on the drum, an endless main conveyer embracing the drum, an endless auxiliary conveyer mounted at one side of the frame in contact with one of the surfaces of the main conveyer, another endless auxiliary conveyer mounted at the other side of the frame and in contact with the opposite surface of the main conveyer, and means to rotate the drum and operate the conveyers.

3. In a machine of the character described, the combination with the main frame, of segmental converging shields mounted thereon, a tapered rotary drum mounted on the main frame between said shields, fiber cleaning means on the drum, a main conveyer embracing the drum longitudinally, an auxiliary conveyer mounted at one side of the frame in contact with one of the surfaces of the main conveyer, another auxiliary conveyer mounted at the other side of the frame and in contact with the opposite surface of the main conveyer, means to bodily adjust the drum, and means to rotate the drum and operate the conveyers.

4. In a machine of the character described, the combination with the main frame, of segmental converging shields mounted thereon, a tapered rotary drum mounted on the main frame between said shields, fiber cleaning means on the drum, a main conveyer embracing the drum longitudinally, an auxiliary conveyer mounted at one side of the frame in contact with one of the surfaces of the main conveyer, another auxiliary conveyer mounted at the other side of the frame and in contact with the opposite surface of the main conveyer, and means to rotate the drum and operate the conveyers.

5. In a machine of the character described, the combination with the main frame, of a rotary drum mounted thereon, fiber cleaning means on the drum, segmental shields mounted on the frame outwardly from the drum, a main conveyer embracing the drum, an auxiliary conveyer mounted at one side of the frame in contact with the upper surface of the main conveyer, another auxiliary conveyer mounted at the other side of the frame and in contact with the lower surface of the main conveyer, a shifting arm extended from the main frame toward one end of the machine and beneath a portion of the main conveyer and then outwardly above the conveyer which contacts with the lower surface of the main conveyer, another shifting arm extended from the main frame toward one end of the machine and above the main conveyer near its juncture with the conveyer which contacts with the lower surface thereof, and means to rotate the drum and operate the conveyers.

6. In a machine of the character described, the combination with the main frame, of a rotary drum mounted thereon, fiber cleaning means on the drum, segmental shields mounted on the frame outwardly from the drum, a main conveyer embracing the drum and having longitudinally extended corrugations in its upper and lower surfaces, an auxiliary conveyer mounted at one side of the frame and having longitudinally extended corrugations to fit with those on one of the surfaces of the main conveyer, another auxiliary conveyer mounted at the other side of the main frame and having longitudinally extended corrugations to fit with those on the opposite surface of the main conveyer, and means to rotate the drum and operate the conveyers.

7. In a machine of the character described, the combination with the main frame, of a rotary drum mounted thereon, decorticating means and fiber cleaning means on the drum, shields mounted on the frame outwardly from the drum, a main conveyer embracing the drum, an auxiliary conveyer mounted at one side of the frame in contact with one of the surfaces of the main conveyer, another auxiliary conveyer mounted at the other side of the frame and in contact with the opposite surface of the main conveyer, and means to rotate the drum and operate the conveyers.

8. In a machine of the character described, the combination with the main frame, of a rotary drum mounted thereon, decorticating means on the drum, rotary brushes journaled at the ends of the drum, shields mounted on the frame outwardly from the drum, a main conveyer embracing the drum, an auxiliary conveyer mounted at one side of the frame in contact with one of the surfaces of the main conveyer, another auxiliary conveyer mounted at the other side of the frame and in contact with the opposite surface of the main conveyer, means to rotate the drum and operate the conveyers, and means to rotate said brushes.

9. In a machine of the character described, the combination with the main frame, of a rotary drum mounted thereon, cutting disks rotatably mounted in groups at each end of the drum, fiber cleaning means on the drum, shields mounted on the frame outwardly from the drum, a main conveyer embracing the drum, an auxiliary conveyer mounted at one side of the frame in contact with one of the surfaces of the main conveyer, another auxiliary conveyer mounted at the other side of the frame and in contact with the opposite surface of the main conveyer, and means to rotate the drum and operate the conveyers.

10. In a machine of the character described, the combination with the main frame, of a rotary drum mounted thereon, rotary disks mounted in groups at each end of the drum, rotary brushes journaled at each end of the drum, scutch blades longitudinally mounted on the drum, a main conveyer embracing the drum, an auxiliary conveyer mounted at one side of the frame and in contact with one of the surfaces of the main conveyer, another auxiliary conveyer mounted at the other side of the frame and in contact with the opposite surface of the main conveyer, means to rotate the drum and operate the conveyers, and means to rotate said brushes.

11. In a machine of the character described, the combination with the main frame, of a rotary drum mounted thereon, decorticating means on the drum, fiber cleaning means on the drum, a main conveyer embracing the drum, an auxiliary conveyer mounted at one side of the frame in contact with the upper surface of the main conveyer, another auxiliary conveyer mounted at the other side of the frame and in contact with the lower surface of the main conveyer, a shifting arm extended from the main frame toward one end of the machine and beneath a portion of the main conveyer and then horizontally and outwardly above the conveyer which contacts with the lower surface of the main conveyer, another shifting arm extended from the main frame toward one end of the machine and above the main conveyer near its juncture with the conveyer which contacts with the lower surface thereof, and means to rotate the drum and operate the conveyers.

12. In a machine of the character described, the combination with the main frame, of a rotary drum mounted thereon, rotary disks mounted at each end of the drum, rotary brushes journaled at each end of the drum, scutch blades longitudinally and adjustably mounted on the drum, a main conveyer embracing the drum, an auxiliary conveyer mounted at one side of the frame in contact with one of the surfaces of the main conveyer, another auxiliary conveyer mounted at the other side of the frame and in contact with the opposite surface of the main conveyer, means to rotate the drum and operate the conveyer, and means to rotate said brushes.

13. In a machine of the character described, the combination with the main frame, of a rotary drum mounted thereon, fiber cleaning means on the drum, a shield mounted on the frame outwardly from the drum, a main conveyer embracing the drum, adjustably supported anti-friction rollers contacting with the lower surface of the main conveyer on one side of the frame and with the upper surface thereof on the other side of the frame, an auxiliary conveyer mounted at one side of the frame in contact with the upper surface of the main conveyer, another auxiliary conveyer mounted at the other side of the frame and in contact with the lower surface of the main conveyer, and means to rotate the drum and operate the conveyers.

14. In a machine of the character described, the combination with the main frame, of a rotary drum mounted thereon, fiber cleaning means on the drum, a shield mounted on the frame outwardly from the drum, a main conveyer embracing the drum, adjustably supported anti-friction rollers contacting with the lower surface of the main conveyer on one side of the frame and with the upper surface thereof on the other side of the frame, an auxiliary conveyer mounted at one side of the frame in contact with the upper surface of the main conveyer, anti-friction rollers contacting with the upper surface of said auxiliary conveyer, another auxiliary conveyer mounted at the other side of the frame and in contact with the lower surface of the main conveyer, anti-friction rollers contacting with the lower surface of the last-named auxiliary conveyer, and means to rotate the drum and operate the conveyers.

15. In a machine of the character described, the combination with the main frame, of segmental converging shields mounted thereon, a tapered rotary drum mounted on the main frame between said shields, fiber cleaning means on the drum, a horizontally disposed wheel journaled at the rear end of the frame and a pair of such wheels journaled at the other end of the frame, a main conveyer embracing said wheels and the drum, an auxiliary conveyer mounted at one side of the frame in contact with one of the surfaces of the main conveyer, another auxiliary conveyer mounted at the other side of the frame and in contact with the opposite surface of the main conveyer, a shifting arm extended from the main frame toward and below the horizontally disposed wheel at the rear of the frame and extended horizontally beneath the rear portion of the main conveyer and then outwardly above the conveyer which contacts with the lower surface of the main conveyer, another shifting arm extended from the main frame toward one end of the machine and above the main conveyer near its juncture with the conveyer which contacts with the lower surface thereof, and means to rotate the drum and operate the conveyers.

16. In a machine of the character described, a main conveyer consisting of a number of links pivotally connected together, each link having longitudinally extended corrugations in two of its opposed surfaces and provided with a recess in one of its sides between said corrugated surfaces, each link also having at one of its ends spaced apart and apertured extensions and at its other end a single apertured extension, the said extensions being located in parallelism with the corrugated surfaces.

17. In a machine of the character described, an auxiliary conveyer consisting of a number of links pivotally connected together, each of said links having on one of its surfaces longitudinally extended corrugations and in each of its sides a recess open at its portion opposite said corrugated surface, each of said links also having at one of its ends a pair of spaced apart and apertured extensions and at its other end a single apertured extension, the said extensions being located at right angles to the corrugated surfaces.

HENRY L. VAUGHAN.

Witnesses:
  CHAS. C. TILLMAN,
  J. E. HANSEN.